US007339515B2

(12) United States Patent
Ferm et al.

(10) Patent No.: US 7,339,515 B2
(45) Date of Patent: Mar. 4, 2008

(54) OPTIMIZED UTILIZATION OF ELECTRONIC COUNTER MEASURES

(75) Inventors: Niklas Ferm, Linköping (SE); Thomas Lindvall, Linköping (SE)

(73) Assignee: Saab AB, Linköping (SE)

( * ) Notice: Subject to any disclaimer, the term of this patent is extended or adjusted under 35 U.S.C. 154(b) by 206 days.

(21) Appl. No.: 11/307,012

(22) Filed: Jan. 19, 2006

(65) Prior Publication Data

US 2006/0267827 A1 Nov. 30, 2006

(30) Foreign Application Priority Data

Jan. 20, 2005 (EP) .................. 05001072

(51) Int. Cl.
*G01S 7/38* (2006.01)
(52) U.S. Cl. ................... 342/13; 342/14; 342/15; 342/57; 342/58; 342/59; 342/195
(58) Field of Classification Search ............ 342/13–19, 342/57–59, 195
See application file for complete search history.

(56) References Cited

U.S. PATENT DOCUMENTS

| 4,307,400 | A | * | 12/1981 | Miley ........................... 342/14 |
| 4,823,139 | A | | 4/1989 | Eisner et al. ................. 342/15 |
| 5,117,422 | A | * | 5/1992 | Hauptschein et al. ....... 370/255 |
| 5,287,110 | A | | 2/1994 | Tran et al. .................... 342/13 |
| 5,610,839 | A | * | 3/1997 | Karolak et al. .............. 455/450 |
| 6,115,580 | A | * | 9/2000 | Chuprun et al. .............. 455/1 |
| 6,147,646 | A | * | 11/2000 | Arneson et al. ............. 342/417 |
| 6,697,008 | B1 | * | 2/2004 | Sternowski .................. 342/14 |

(Continued)

FOREIGN PATENT DOCUMENTS

EP 1684088 A1 * 7/2006

OTHER PUBLICATIONS

"Electronic countermeasures", Mosinski, J.D. Tactical Communications Conference, 1992. vol. 1 Tactical Communications: Technology in Transition., Proceedings of the Apr. 28-30, 1992 pp. 191-195 vol. 1.*

(Continued)

*Primary Examiner*—John B Sotomayor
(74) *Attorney, Agent, or Firm*—Albihns AB

(57) ABSTRACT

The invention relates to a distributed electronic counter measures solution, wherein jamming signals ($J_A$; $J_B$) may be emitted towards threats (X1, X2) from counter measures stations in multiple vehicles (A, B), which are physically separated from one another in order to improve the chances of survival the vehicles (A, B) as well as any other vehicles that are associated with these vehicles (A, B) in a group of vehicles. The vehicles in the group exchange messages (D) over a wireless data link (L), where the messages (D) sent from a particular station specify an availability status ($D_{res\text{-}status}$) for each electronic warfare resource in the station and a threat status ($D_{thr\text{-}status}$) registered by the station. A station in the group having a central planning function coordinates any jamming signals ($J_A$; $J_B$) emitted from the electronic warfare resources of the stations in the group, such that the resources are optimally used with respect to all of any registered threats (X1, X2). This coordination is based on estimated geometric interrelationships between the at least two stations in the group; estimated geometric relationships between the at least two stations in the group and at least one registered threat (X1, X2); and the respective resources of each station in the group.

22 Claims, 3 Drawing Sheets

U.S. PATENT DOCUMENTS

| | | | | |
|---|---|---|---|---|
| 6,839,017 | B1* | 1/2005 | Dillman | 342/16 |
| 2002/0145554 | A1 | 10/2002 | Lloyd et al. | 342/13 |
| 2003/0068981 | A1 | 4/2003 | Duthie | 455/67.11 |
| 2004/0061595 | A1* | 4/2004 | Yannone et al. | 340/425.5 |
| 2005/0001755 | A1* | 1/2005 | Steadman et al. | 342/14 |
| 2006/0267827 | A1* | 11/2006 | Ferm et al. | 342/14 |
| 2007/0226247 | A1* | 9/2007 | Ferm et al. | 707/102 |

OTHER PUBLICATIONS

"Test program sets on the flightline—a case study verifying jammers", Williams, W.; Orlidge, L. AUTOTESTCON 2003. IEEE Systems Readiness Technology Conference. Proceedings Sep. 22-25, 2003 pp. 298-304.*

"Link-layer jamming attacks on S-MAC", Law, Y.W.; Hartel, P.; den Hartog, J.; Havinga, P. Wireless Sensor Networks, 2005. Proceeedings of the Second European Workshop on Jan. 31-Feb. 2, 2005 pp. 217-225.*

* cited by examiner

OPTIMIZED UTILIZATION OF ELECTRONIC COUNTER MEASURES

FIELD OF THE INVENTION

The present invention relates generally to electronic warfare and electronic counter measures. More particularly, the invention relates to a method of producing jamming signals and electronic counter measure stations.

BACKGROUND OF THE INVENTION

Electronic warfare systems play an increasingly important role in modern battle scenarios. Tactical electronic warfare assets are therefore included in almost every new military land, sea or air vehicle. These assets may primarily be used for the purposes of self-protection (i.e. jamming an enemy weapon and/or vehicle to decrease the quality of any measurements performed by this weapon and/or vehicle, and thereby improve the chances of own survival), or for the purposes of generating a background noise intended to improve the protection of the vehicle itself, or other vehicles included in a fleet or group of vehicles. The input data for controlling the vehicle mounted electronic warfare resources is here either derived from an interception receiver on each vehicle, preplanned actions or manually initiated operations performed by an operator/driver. Any coordinated radiation of jamming signals from different vehicles is primarily accomplished via verbal communication between the operators/drivers of the vehicles and manual actions executed by these persons.

However, the document U.S. Pat. No. 6,697,008 describes a distributed electronic warfare system wherein a central control site on the ground automatically coordinates jamming signals radiated from a plurality of electronic warfare pods attached to a variety of air-crafts, such that an improved jamming effect is attained against a particular target. Nevertheless, the system is not capable of optimizing the use of the electronic warfare in complex battle scenarios, for instance when combating multiple threats based on many jamming signal transmitters. Moreover, a stationary central control site renders the system vulnerable and inflexible.

SUMMARY OF THE INVENTION

It is therefore an object of the present invention to alleviate the above problems and thus provide a flexible and reliable solution for the overall utilization of the electronic warfare resource in a group of cooperating vehicles.

According to one aspect of the invention this object is achieved by the method of producing jamming signals as described initially, wherein the messages are exchanged with the at least one other station in the group. The messages sent from a particular station include data pertaining to an availability status for each resource in the station's local set and a threat status registered by the station. The method involves checking whether the station shall assume a central planning function in respect of a complete set of electronic warfare resources including all electronic warfare resources of the at least two stations in the group. Provided that the station is to assume the central planning function, the method includes coordinating any emission of jamming signals from the resources in the complete set based on: estimated geometric interrelationships between the at least two stations in the group; estimated geometric relationships between the at least two stations in the group and at least one threat registered by at least one station in the group; and the respective local set of each station in the group.

An important advantage attained by this method is that a large number of threats may be combated very efficiently without any coordination from a stationary central control site. This vouches for a high flexibility and resistance capability.

According to a preferred embodiment of this aspect of the invention, the method involves specifying signal parameter information pertaining to a number of known threats; specifying the electronic warfare resources of the complete set; and identifying, for each of said threats, at least one of the resources in the complete set that is estimated to constitute an appropriate counter measure to combat the threat. This is desirable, since thereby further guidance is provided as how to best combat a threat by means of coordinated emissions of jamming signals.

According to another preferred embodiment of this aspect of the invention, it is specified, for each combination of threat and appropriate counter measure, whether the threat is preferably combated by means of distributed counter measures involving emission of jamming signals from two or more stations, or by means of jamming signals emitted from a singular station. Thus, any distributed emission of jamming signals may be planned to attain an even higher jamming efficiency.

According to yet another preferred embodiment of this aspect of the invention, provided that the station has the central planning function, the method involves coordinating the emission of jamming signals from the stations in the group, such that an overall use of the resources in the complete set is estimated to be optimized with respect to all of the at least one registered threat.

According to still another preferred embodiment of this aspect of the invention, the method involves: specifying in each station, for each electronic warfare resource in the station's local set, an availability status reflecting whether the resource is currently available for emitting jamming signals; repeatedly registering a threat status reflecting any existence of threats; repeatedly transmitting messages to the at least one other station in the group, where the transmitted messages include the availability status and a threat status; repeatedly receiving messages from the at least one other station in the group, where the received messages include availability statuses and threat statuses in respect of each of the at least one other station in the group; and updating, based on the received messages, a group resource listing with a current resource activation status for each electronic warfare resource included in the at least one other station of the group. These steps are advantageous, since thereby all stations in the group are kept updated regarding all registered threats as well as by means of which counter measures that these threats are combated.

According to yet another preferred embodiment of this aspect of the invention, provided that station not has the central planning function, the method involves: receiving request messages over the wireless data link; and/or receiving deactivation orders over the wireless data link; and activating respective deactivating specified electronic warfare resources in response to any received request messages and/or deactivation orders. Hence, a non-planning station is controlled to emit jamming signals according to a planning station's coordination instructions.

According to still another preferred embodiment of this aspect of the invention, provided that station not has the central planning function, the method in case of at least one received request message further involves comparing a first set of threat parameters of each of the at least one received request messages with any second set of threat parameters associated with threat statuses registered by the station to obtain a correlated threat parameter set for each threat in respect of which request messages has been received. The method then involves activating the electronic warfare resources specified in the at least one received request message based on each correlated threat parameter set. This is advantageous; since thereby each station can use locally measured parameters, e.g. relevant geometric directions and signal parameters, to enhance the efficiency of the jamming signals emitted on request by the station which has the central planning function.

According to another preferred embodiment of this aspect of the invention, provided that station not has the central planning function, the method involves sending a reject message in response to a received request message if an electronic warfare resource specified in the request message cannot be activated by the station. Thus, the station having the central planning function is promptly informed of any requests that cannot be executed, for instance because of a prioritizing made by a pilot (or other operator) in the vehicle in which the receiving station is located.

According to still another preferred embodiment of this aspect of the invention, provided that the resource-handling unit has the central planning function, the method involves: compiling, based on any registered threats and any received messages from the other stations in the group, a threat listing including all threats registered by at least one station in the group; determining, based on the group resource listing, for each threat in the threat listing whether the threat appears to be combated by an appropriate resource in the complete set, and if an alternative distribution of electronic warfare resources different from a current distribution given by the group resource listing is estimated to be superior to the current distribution in respect of jamming efficiency; sending out request messages and/or deactivation orders with such addressees and specifications that the electronic warfare resources of the at least two stations in the group emit jamming signals according to the alternative distribution.

According to another preferred embodiment of this aspect of the invention, provided that the station has the central planning function, the method involves maintaining emission of a particular jamming signal until: all threats combated by the particular jamming signal have ceased to constitute threats, or until another electronic warfare resource appears to be more appropriate to instead emit the particular jamming signal given the threat listing and the group resource listing. If however, the station not has the central planning function, the method involves maintaining emission of a particular jamming signal until receiving a deactivation order in respect of that jamming signal over the wireless data link. Consequently, jamming signals are only emitted as long as necessary and are primarily generated by those stations from which such signals are deemed to have the best effects.

According to another aspect of the invention this object is achieved by a computer program directly loadable into the internal memory of a digital computer, comprising software for controlling the method described above when said program is run on a computer.

According to yet another aspect of the invention this object is achieved by a computer readable medium, having a program recorded thereon, where the program is to make a computer perform the method described above.

According to another aspect of the invention, this object is achieved by the electronic counter measures station as described initially, wherein the station is associated with at least one threat warning system adapted to register threats and in response thereto produce a threat status. The communication unit is adapted to exchange the messages with the at least one other station in the group, and the messages sent from a particular station comprise data pertaining to an availability status for each resource in the station's local set and the threat status registered by the station. Moreover, the station includes a resource-handling unit, which is adapted to assume a central planning function in respect of a complete set of electronic war-fare resources including all electronic warfare resources of the at least two stations in the group. When having the central planning function, the resource-handling unit is further adapted to coordinate any jamming signals emitted from the resources in the complete set based on: estimated geometric interrelation-ships between the at least two stations in the group; estimated geometric relationships between the at least two stations in the group and at least one registered threat; and the respective local set of each station in the group.

The advantages of this station, as well as the preferred embodiments thereof, are apparent from the discussion hereinabove with reference to the proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
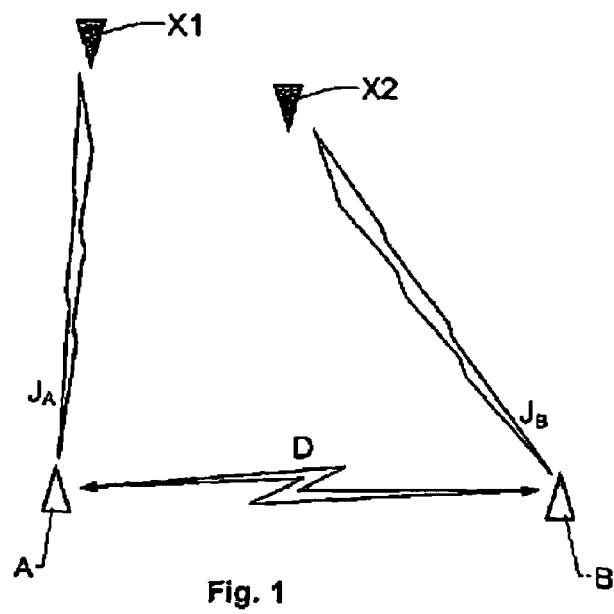
FIG. 1 illustrates an electronic warfare situation, in which the invention may be employed to optimize the usage of electronic warfare resources of a group of cooperating vehicles.

FIG. 1 illustrates an electronic warfare situation, in which the invention may be employed to optimize the usage of electronic warfare resources of a group of cooperating vehicles A and B.

Here, the vehicles A and B are threatened by two hostile vehicles X1 and X2 respectively. We further presume that the optimal electronic counter measures to combat the threats X1 and X2 are to emit a particular first jamming signal $J_A$ from a first vehicle A and emit a particular second jamming signal $J_B$ from a second vehicle B in the group. In order to accomplish this, the threats X1 and X2 must be identified (at least with respect to certain signal parameters), and the signal emission from the vehicles A and B must be coordinated. According to the invention, an electronic counter measures station in each vehicle A and B repeatedly searches for and registers potential threats (e.g. by means of an interception receiver). Information pertaining to any detected threat is then communicated to the other stations in the group by means of messages D over a wireless data link L. The messages D also reflect a current availability status for the electronic warfare resources in the station from which the message is sent.

Thus, based on the messages D, all the stations in the group (here A and B) can maintain a respective local record of all registered threats as well as a listing over how the electronic warfare resources at the group's disposal are used to combat these threats. Moreover, the station in each vehicle preferably holds a database, which for each of a number of known threats specifies signal parameter information and an identification of which counter measure that is appropriate for combating the threat. Consequently, given the messages D and the onboard database, each station is provided with a theoretical basis for selecting a suitable counter measure against each known threat. Nevertheless, in order to optimize the overall use of all the resources disposed by the stations in the group, a central planning function is required. According to the invention any station may assume this role, and the role may be allocated in many different ways. For example, a particular station may be assigned to have the central planning function in respect of a group of stations before initiating a mission. Alternatively, the central planning function may be assigned when a first threat is registered by at least one station in the group, either randomly or to the station that registered this threat. However, preferably, one and the same station has the central planning function during an entire mission. Naturally, this function is possible to hand over to an alternative station if the station originally having this role is destroyed, or malfunctions due to other reasons.

In any case, the station having the central planning function, coordinates any emission of jamming signals from the electronic warfare resources of the stations in the group, i.e. here carried by the vehicles A and B respectively, such that the signal emission is optimized with respect to the overall jamming efficiency. Which jamming signal that should be emitted from which station(s) and be directed against which threat(s) is determined based on estimated geometric interrelationships between the stations in the group, estimated geometric relationships between the stations and the threat (s), and the respective electronic warfare resources of each station.

Figure 2:
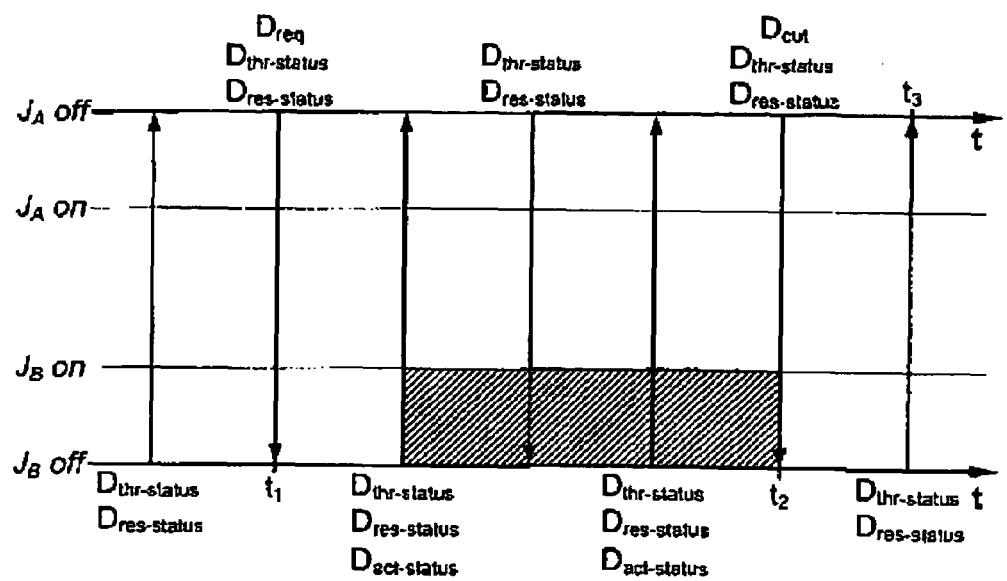
FIG. 2 shows time lines, which illustrate reporting and co-operation procedure according to the invention.

Referring now to FIG. 2, the proposed coordinated use of electronic warfare resources in different stations will be discussed in further detail. The FIG. 2 shows a first time line representing an electronic warfare resource of a first electronic counter measures station, and a second time line representing an electronic warfare resource of a second electronic counter measures station. Each time line illustrates an on-state $J_A$ on and $J_B$ on respectively in which a jamming signal is emitted from the resource in question, and an off-state $J_A$ off and $J_B$ off respectively in which no jamming signal is emitted. The vehicles A and B repeatedly (e.g. at regular intervals) exchange messages, preferably during an entire mission, whereby the messages reflect a current status of the electronic warfare resources included in the respective vehicle and information about any registered threats.

As long as no threat has been registered the electronic warfare resources are typically inactivated, and thus the messages $D_{thr\text{-}status}$ and $D_{res\text{-}Status}$ exchanged during this period reflect no threats and unused resources respectively. However, at one point in time the first station registers a threat. For illustrative purposes we here assume (i) that the first station has (or assumes) the central planning function, and (ii) that, given the circumstances, it is deemed appropriate that a particular type of jamming signal $J_B$ be emitted from the second station in order to combat this threat. Therefore, at $t_1$, the first station sends a request message $D_{req}$ addressed to the second station, which orders the second station to emit the signal $J_B$ against the registered threat. The request message $D_{req}$ may include various geometric parameters to facilitate this emission task, for in-stance if the second station has not yet detected the threat.

The second station then starts to generate the signal $J_B$ according to request message $D_{req}$ and consequently a subsequent message from the second station, in addition to the threat and resources statuses $D_{thr\text{-}status}$ and $D_{res\text{-}status}$ normally reported, includes an action status $D_{act\text{-}status}$. The action status Dact-status indicates which jamming signal (i.e. here $J_B$) that has been emitted from which electronic warfare resource. Preferably, the action status $D_{act\text{-}status}$ also contains a threat identifier (which uniquely describes the combated threat). Namely, one and the same threat may be combated by means of many signals, and conversely, one jamming signal may be used against multiple threats, so a linking between threats and applied counter measures is generally desired. Furthermore, according to the invention, the emission of jamming signals is optimized with respect to the total amount of electronic warfare resources disposable by a group of stations, so that two or more stations are prevented from combating one and the same threat if this leads to that one or more other threats to the group cannot be combated appropriately.

According to a preferred embodiment of the invention, before starting to generating the signal $J_B$, the second station compares a first set of threat parameters of the received request message $D_{req}$ with corresponding threat parameters that may have been measured by the station itself, i.e. with a second set of threat parameters associated with threat statuses $D_{thr\text{-}Status}$ registered by the second station. As a result of this comparison, a correlated threat parameter set is obtained, where the specification of the request message $D_{req}$ is linked to relevant locally registered parameters. Then, one or more the electronic warfare resources specified in the request message $D_{req}$ are activated, i.e. in this case the jamming signal $J_B$ is emitted. Such a correlation is advantageous because certain jamming signals require locally measured geometric and signal parameters to be fully efficient, and for a majority of jamming signals locally performed measurements improve the jamming efficiency possible to attain.

Of course, the automated strategy proposed in this document for controlling vehicle mounted electronic warfare resources does not preclude any manually initiated operations in respect of these resources, which may be performed by an operator/driver of the vehicle that carries the station. Therefore, if for instance due to a prioritizing made by a pilot (or other operator) in the vehicle in which the receiving station is located, the second station cannot activate an electronic warfare resource specified in the request message $D_{req}$, the second station preferably returns a reject message in response to a received request message $D_{req}$. Hence, the first station is promptly informed of the situation, and may choose to use an alternative station for emitting an appropriate jamming signal.

During the period when jamming signals are emitted, the first and second stations continue to exchange messages which indicate relevant statuses of the stations. Specifically, this means that the messages from the first station report threat and resources statuses $D_{thr\text{-}status}$ and $D_{res\text{-}status}$ and the messages from the second station report a corresponding threat status $D_{thr\text{-}status}$ a corresponding resource status $D_{thr\text{-}status}$ plus an action status $D_{act\text{-}Status}$.

At a later point in time $t_2$, the first station determines that the jamming signal $J_B$ should no longer be emitted from the second station, and therefore sends a deactivation order $D_{cut}$ to the second station. There may be many reasons for such an order, for example that the threat combated by the signal $J_B$ no longer constitutes a threat, or that it is now deemed more appropriate to originate the signal from an alternative station. In any case, the second station ceases to emit the jamming signal $J_B$, and as a result a message sent at a yet later point in time $t_3$ only contains the standard threat and resources statuses $D_{thr\text{-}status}$ and $D_{res\text{-}status}$.

Even though the FIGS. 1 and 2 only show two cooperating stations, it is readily understood by the skilled person that the proposed coordinated emission of jamming signals may preferably be extended to three or more stations. However, for reasons of a clear presentation this is not explicitly discussed in the present document.

Figure 3:
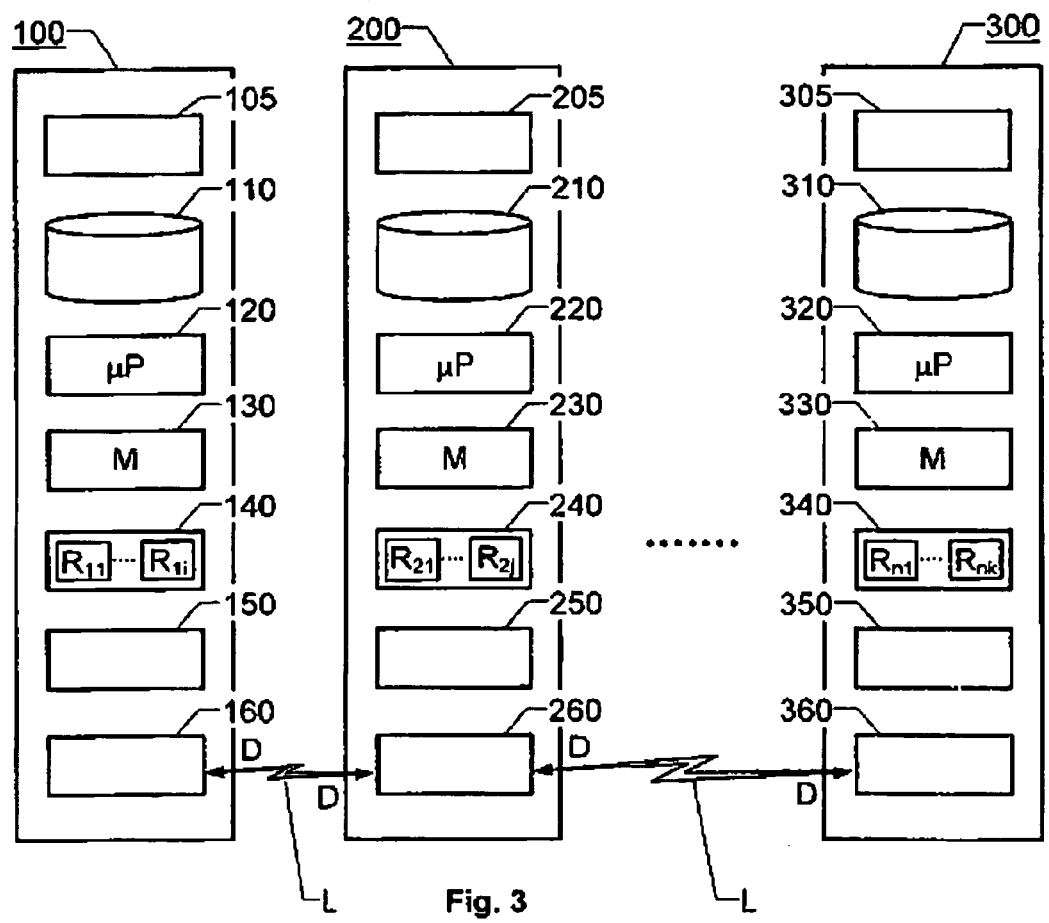
FIG. 3 shows block diagrams over the stations in a group which cooperate according to one embodiment of the invention.

FIG. 3 shows block diagrams over electronic counter measures stations 100, 200 and 300 in a group of stations which are adapted to cooperate according to one embodiment of the invention. Specifically, the stations 100, 200 and 300 are adapted to radiate jamming signals in response to request messages and deactivation orders from a particular station, say 100, in the group such that the emission of jamming signals from all the stations 100, 200 and 300 in the group is optimized with respect to the jamming efficiency against any registered threats.

All the stations 100, 200 and 300 include essentially the same devices and units. However, the number and types of resources $R_{11} \ldots, R_{1i}, R_{21} \ldots, R_{2j}; R_{n1}, \ldots, R_{nk}$ included in a local set of electronic warfare resources 140, 240 and 340 respectively may vary from station to station.

Nevertheless, a first station 100 preferably includes (or is associated with) at least one threat warning system 105. The first station 100 also includes a database 110, a local set of electronic warfare resources 140, a resource-handling unit 150 and a communication unit 160. The threat warning system 105 typically includes an interception receiver, which is adapted to detect signals emitted by potential enemy vehicles and/or missiles. The local set of electronic warfare resources 140 includes at least one electronic warfare resource $R_{11}, \ldots, R_{1j}$, which is adapted to generate and emit at least one type of jamming signal. The resource-handling unit 150 is adapted to repeatedly control the communication unit 160 to exchange status messages D with the other stations 200, 300 over a wireless data link L. As mentioned above, the messages D comprise data pertaining to statuses of the station's 100, 200, 300 electronic warfare resources and any registered threats. Specifically, a message D transmitted from the first station 100 contains data pertaining to a respective status of the resources $R_{11}, \ldots, R_{1n}$ in the local set of electronic warfare resources 140. Correspondingly, a message D transmitted from a second station 200 contains data pertaining to a respective status of the resources $R_{21}, \ldots, R_{2j}$ in an local set of electronic warfare resources 240 of this station plus any threats registered by the station, and so on. Typically, the frequency at which messages D are exchanged over the link L depends on the number of stations that are associated with one another to form a group, such that in a relatively large group the update frequency is comparatively low, and vice versa. However, the update rate normally lies in the interval 1 to 2 seconds.

The procedure performed by the resource-handling unit 150 depends primarily on whether the particular unit has assumed a central planning function or not in respect of a complete set of electronic warfare resources including all electronic warfare resources $R_{11}, \ldots, R_{1j}; R_{21}, \ldots, R_{1j}; \ldots, R_{nk}$ of the stations 100, 200 and 300 in the group. Provided that the resource-handling unit 150 has such a role, the unit 150 is adapted to coordinate any jamming signals emitted from the resources in the complete set based on at least the following parameters: estimated geometric interrelationships between the stations 100, 200 and 300 in the group; estimated geometric relationships between the at least two stations 100, 200 and 300 in the group and at least one registered threat; and the respective local set 140, 240 and 340 of each station 100, 200 and 300 in the group.

Otherwise, i.e. if the resource-handling unit 150 not has the central planning function for the complete set of electronic warfare resources in the group, the unit essentially plays a reactive role, wherein it controls the electronic warfare resources $R_{11}, \ldots, R_{1j}$ of the local set according to received request messages and deactivation orders respectively having been received over the data link L from the station in which a central planning resource-handling unit 150 is located. Of course, according to the invention, the resource-handling unit 150, 250 and 350 in each station 100, 200 and 300 respectively must be adapted to have the central planning function.

Figure 4:
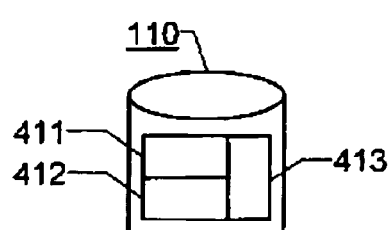
FIG. 4 illustrates a proposed database to be included in each station according to one embodiment of the invention.

According to a preferred embodiment of the invention, the station 100 contains a database 110, which in turn, includes a threat library 411, a counter measure library 412 and a table 413. The details of this database 110 will be elucidated below with reference to FIG. 4.

The threat library 411 specifies signal parameter information pertaining to a number of known threats. The counter measure library 412 specifies a complete set of electronic warfare resources, containing any resources which are included in at least one of the stations 100, 200 or 300 in the group, i.e $R_{11}, \ldots R_{1i}; R_{21}, \ldots R_{2j}; R_{n1}, \ldots, R_{nk}$. Preferably, the library 412 also specifies certain geometric conditions under which the particular resource is applicable. The table 413 in the database 110 identifies, for each threat in the library 412, at least one of the resources in the complete set of electronic warfare resources $R_{11}, \ldots, R_{1i}; R_{21}, \ldots, R_{2j}; R_{n1}, \ldots R_{nk}$ that is estimated to constitute an appropriate counter measure to combat the threat. According to one preferred embodiment of the invention, for each combination of threat and appropriate counter measure, the table 413 also specifies whether the threat is preferably combated by means of distributed counter measures involving emission of jamming signals from two or more stations, or by means of jamming signals emitted from a singular station. Thus, when the station 100 registers a threat, e.g. by means of the warning system 105, the database may provide information as how to best combat this threat, i.e. which electronic warfare resources to use as well as the parameters for the jamming signal(s) to emit.

Preferably, the database 110 is prepared before instigating a certain mission, such that it stores as relevant and updated in-formation as possible. It is also highly preferable if corresponding databases 210 and 310 in the other stations 200 and 300 respectively contain information which is identical to the information in the database 110.

Figure 5:
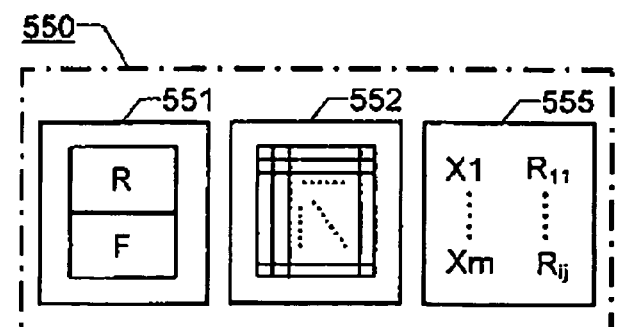
FIG. 5 shows a block diagram over a counter measures resources record according to one embodiment of the invention.

FIG. 5 shows a block diagram over a counter measures resources record 550 to be stored in (or be associated with) the resource-handling unit 150 according to one embodiment of the invention. The record 550 contains a local resource listing 551, a group resource listing 552 and a threat listing 555.

The local resource listing 551 specifies, for each electronic warfare resource $R_{11}, \ldots, R_{1i}$ included in the station 100, whether the resource is currently available or not (i.e. if the resource is operable and free, or if the resource is occupied or unusable due to technical problems). The group resource listing 552 specifies an activation status for each electronic warfare resource $R_{21}, \ldots, R_{2j}$ and $R_{n1}, \ldots, R_{nk}$ included in the other stations 200 and 300 of the group. The threat listing 555 includes all the threats $X1, \ldots, Xm$ registered by at least one station in the group.

The resource-handling unit 150 repeatedly (preferably at regular intervals) checks the status of the resources $R_{11}, \ldots, R_{2i}$ in the local set of electronic warfare resources, and updates the group resource listing 552 accordingly with a current resource activation status for each resource. This data is also included in the resource statuses $D_{res\text{-}status}$, which are sent to the other stations 200 and 300 over the wireless data link L. Moreover, based on corresponding messages received from the other stations 200 and 300 in the group, the resource-handling unit 150 repeatedly (preferably at regular intervals) updates the group resource listing 552 with a current resource activation status for each resource of the electronic warfare resource $R_{21}, \ldots, R_{2j}$ and $R_{n1}, \ldots, R_{nk}$ included in these stations 200 and 300.

Hence, whenever the resource-handling unit 150 having the central planning function determines that a threat exists, either based on an output from its own threat warning system 105 or based on received threat statuses $D_{thr\text{-}status}$, the unit 150 may consult the counter measures resources record 550 to find suitable resources to combat this threat. If, on the further basis of the database 110, this resource-handling unit 150 finds that it is appropriate to use one or more counter measures resources of the other stations 200 and 300 to combat this threat, relevant requests are sent out over the wireless data link L to these stations via the communication unit 160 according to what has been described above with reference to the FIGS. 1 and 2.

Returning again to the FIG. 3, each of the second 200, third etc. station up to an n:th station 300 associated with one another in a group includes devices and units 205;305, 210; 310, 220; 320, 230; 330, 240; 340, 250; 350, 260; 360 and 270; 370 equivalent to the device and units 105, 110, 120, 130, 140, 150, 160 and 170 respectively described above with reference to the first station 100.

Figure 6A:
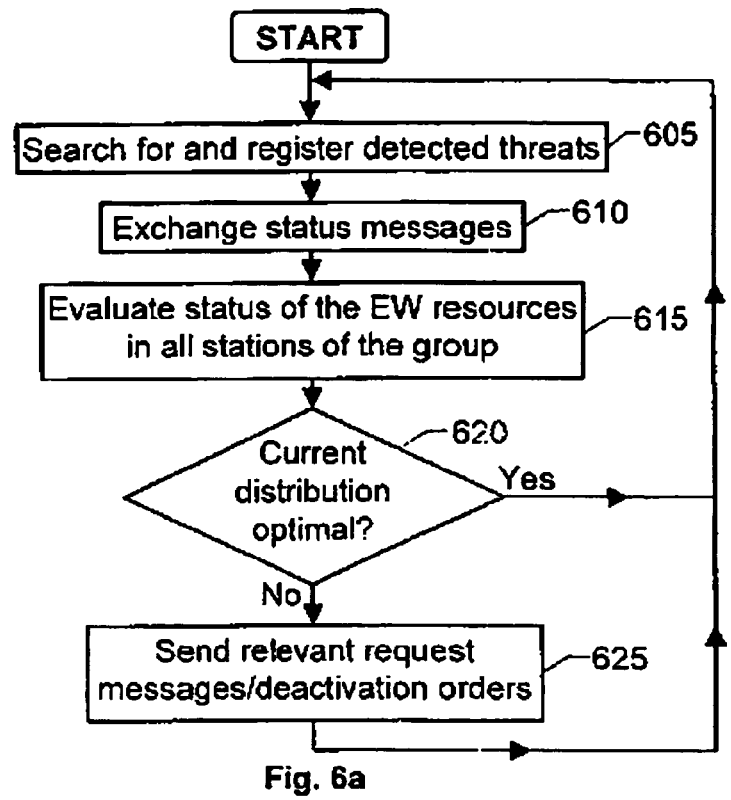
FIGS. 6a-b show flow diagrams over the general method according to the invention.

In order to sum up, the general method for coordinating electronic counter measures from a resource-handling unit having the central planning function according to the invention will now be described with reference to a flow diagram in FIG. 6a.

A first step 605, searches for and registers any detected threats, for instance by means of one or more dedicated threat warning systems. Then, a step 610 effects an exchange of status messages with the other stations in a group of stations to which the station in which the resource-handling unit is located belongs. After that, a step 615 evaluates the statuses of the electronic warfare resources at the group's disposal. Subsequently, a step 620 investigates whether any existing threats appear to be combated by an optimal set of resources in the complete set, and if so the procedure loops back and returns to the step 605. Otherwise, i.e. if an alternative distribution of electronic warfare resources different from a current distribution is estimated to be superior to the current distribution in respect of jamming efficiency, a step 625 follows. The step 625 sends out request messages and/or deactivation orders with such addressees and specifications that the electronic warfare resources of the stations in the group emit jamming signals according to the alternative distribution. Hence, this adaptation of the resources used involves also the station in which the resource-handling unit having the central planning function is located. Theoretically this station alone may be affected, and in such a case no request messages or deactivation orders need to be sent.

Figure 6B:
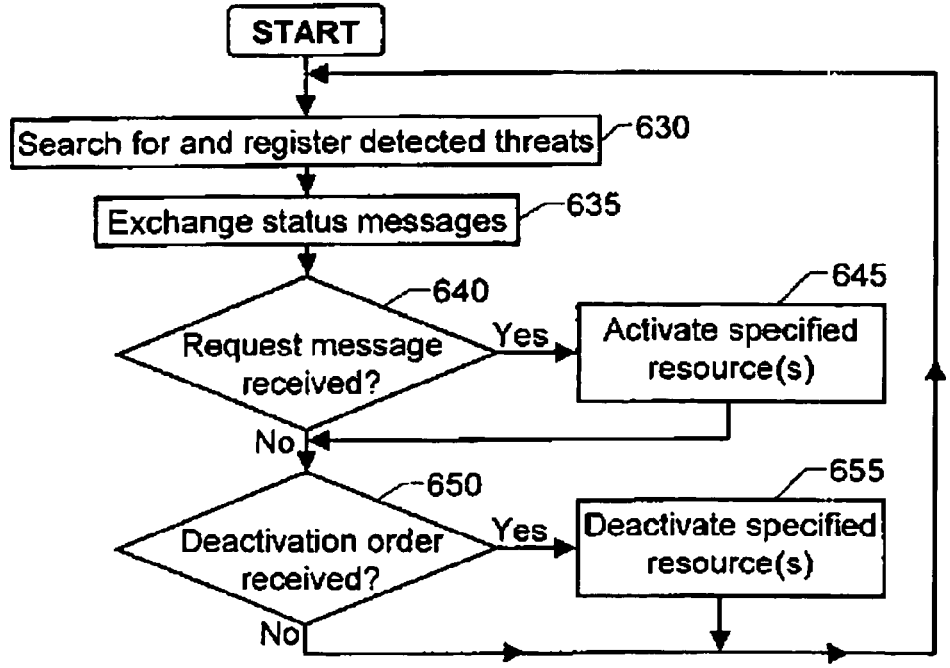

Now, for completeness, the general method performed by a resource-handling unit, which does not have the central planning function will be described with reference to a flow diagram in FIG. 6b.

A first step 630 searches for and registers any detected threats, for instance by means of one or more dedicated threat warning systems. Then, a step 610 effects an exchange of status messages with the other stations in a group of stations to which the station in which the resource-handling unit is located belongs.

After that, s step 640 checks whether any request message has been received, and if so a step 645 follows. Otherwise the procedure continues to a step 650. The step 645 activates at least one electronic warfare resource in accordance with the specifications in the request message, where after the step 650 follows. Here, it is checked whether a deactivation order has been received. If so, a step follows in which at least one electronic warfare resource is deactivated according to the specifications of the deactivation order. Then, the procedure loops back to the step 630. If however, in step 655 no deactivation order is received, the procedure loops directly back to the step 630.

All of the process steps, as well as any sub-sequence of steps, described with reference to the FIGS. 6a and 6b above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, inte-gers, steps or components or groups thereof.

The invention is not restricted to the described embodiments in the figures, but may be varied freely within the scope of the claims.

What is claimed is:

1. A method of producing jamming signals from a distributed counter measures system including at least two stations (100, 200, 300) which are physically separated from one another and associated with one another in a group of stations, each station (100) having a local set (140) of electronic warfare resources ($R_{11}, \ldots, R_{1i}$) including at least one resource which is adapted to generate and emit at least one type of jamming signal ($J_A$), the method in each station (100) comprising exchanging messages (D) over a wireless data link (L), wherein the method comprising the steps of:

exchanging the messages (D) with the at least one other station (200, 300) in the group, the messages (D) sent from a particular station (100) comprising data pertaining to an availability status ($D_{res\text{-}status}$) for each resource in the station's (100) local set (140) and a threat status ($D_{thr\text{-}status}$) registered by the station (100); and checking whether the station (100) shall assume a central planning function in respect of a complete set of electronic warfare resources (140+240+340) including all electronic warfare resources ($R_{11}, \ldots, R_{1i}$; $R_{21}, \ldots, R_{1j}$; $R_{n1}, \ldots, R_{nk}$) of the at lease two stations (100, 200, 300) in the group; and given that the station (100) is to assume the central planning function, the method comprising coordinating any emission of jamming signals ($J_A$; $J_B$) from the resources in the complete set based on:

estimated geometric interrelationships between the at least two stations (100, 200, 300) in the group, estimated geometric relationships between the at least two stations (100, 200, 300) in the group and at least one threat (X1, X2) registered by at least one station in the group, and the respective local set (140, 240, 340) of each station (100, 200, 300) in the group.

2. The method according to claim 1, wherein specifying signal parameter information pertaining to a number of known threats;

specifying the electronic warfare resources of the complete set (140+240+340); and identifying, for each of said threats, at least one of the resources in the complete set (140+240+340) that is estimated to constitute an appropriate counter measure to combat the threat.

3. The method according to claim 2, wherein for each combination of threat and appropriate counter measure specifying whether the threat is preferably combated by means of distributed counter measures involving emission of jamming signals from two or more stations, or by means of jamming signals emitted from a singular station.

4. The method according to claim 1, wherein provided that station (100) has the central planning function, the method comprising coordinating the emission of jamming signals ($J_A$; $J_B$) from the stations (100, 200, 300) in the group such that an overall use of the resources in the complete set (140+240+340) is estimated to be optimized with respect to all of the at least one registered threat (X1, X2).

5. The method according to claim 1, wherein specifying in each station (100), for each electronic warfare resource ($R_{11}, \ldots, R_{1i}$) in the station's (100) local set (140), an availability status ($D_{res\text{-}status}$) reflecting whether the resource is currently available for emitting jamming signals;

registering, repeatedly, a threat status ($D_{thr\text{-}status}$) reflecting any existence of threats (X1, X2);

transmitting, repeatedly, messages (D) to the at least one other station (200, 300) in the group, the transmitted messages (D) comprising the availability status ($D_{res\text{-}status}$) and a threat status ($D_{thr\text{-}status}$);

receiving, repeatedly, messages (D) from the at least one other station (200, 300) in the group, the received messages (D) comprising availability statuses ($D_{res\text{-}status}$) and threat statuses ($D_{thr\text{-}status}$) in respect of each of the at least one other station (200, 300) in the group; and updating, based on the received messages (D), a group resource listing (552) with a current resource activation status for each electronic warfare resource ($R_{21}, \ldots, R_{2j}$; $R_{n1}, \ldots, R_{nk}$) included in the at least one other station (200, 300) of the group.

6. The method according to claim 5, wherein provided that station (100) not has the central planning function, the method comprising:

receiving request messages ($D_{req}$) over the wireless data link (L); and/or receiving deactivation orders ($D_{cut}$) over the wireless data link (L); and activating respective deactivating specified electronic warfare resources in response to any received request messages ($D_{req}$) and/or messages orders ($D_{cut}$).

7. The method according to claim 6, wherein provided that station (100) not has the central planning function, the method in case of at least one received request message ($D_{req}$) further comprising:

comparing a first set of threat parameters of each of the at least one received request messages ($D_{req}$) with any second set of threat parameters associated with threat statuses ($D_{thr\text{-}status}$) registered by the station (100) to obtain a correlated threat parameter set for each threat in respect of which request messages ($D_{req}$) has been received; and activating the electronic warfare resources specified in the at least one received request message ($D_{req}$) based on each correlated threat parameter set.

8. The method according to claims 6, wherein provided that station (100) not has the central planning function, the method comprising sending a reject message in response to a received request message ($D_{req}$) if an electronic warfare resource specified in the request message ($D_{req}$) cannot be activated by the station (100).

9. The method according to claim 5, wherein provided that the resource handling unit (150) has the central planning function, the method comprises:

compiling, based on the threat statuses ($D_{thr\text{-}status}$) and any received messages (D) from the other stations (200; 300) in the group, a threat listing (555) comprising all threats (X1, . . . , Xm) registered by at least one station (100, 200, 300) in the group;

determining, based on the group resource listing (552), for each threat (X1, . . . , Xm) in the threat listing (555) whether the threat appears to be combated by an appropriate resource in the complete set (140+240+340); and if an alternative distribution of electronic warfare resources different from a current distribution given by the group resource listing (552) is estimated to be superior to the current distribution in respect of jamming efficiency sending out request messages ($D_{req}$) and/or deactivation orders ($D_{cut}$) with such addressees and specifications that the electronic warfare resources ($R_{11}, \ldots, R_{1i}; R_{21}) \ldots, R_{1j}; R_{n1}, \ldots, R_{nk}$) of the at least two stations (100, 200, 300) in the group emit jamming signals according to the alternative distribution.

10. The method according to claim 5, wherein
provided that the station (100) has the central planning function, the method comprising maintaining emission of a particular jamming signal ($J_A$) until:
all threats combated by the particular jamming signal ($J_A$) have ceased to constitute threats, or
given the threat listing (555) and the group resource listing (552), another electronic warfare resource ($R_{11}, \ldots, R_{1i}; R_{21}, \ldots R_{1j}; R_{n1}, \ldots, R_{nk}$) appears to be more appropriate to instead emit the particular jamming signal ($J_A$); and otherwise, the method comprising maintaining emission of a particular jamming signal ($J_B$) until receiving a deactivation order ($D_{cut}$) in respect of that jamming signal ($J_B$) over the wireless data link (L).

11. A computer program directly loadable into the internal memory of a digital computer, comprising program code for producing jamming signals from a distributed counter measures system including at least two stations (100, 200, 300) which are physically separated from one another and associated with one another in a group of stations, each station (100) having a local set (140) of electronic warfare resources ($R_{11}, \ldots, R_{1i}$) including at least one resource which is adapted to generate and emit at least one type of jamming signal ($J_A$), the method in each station (100) comprising exchanging messages (D) over a wireless data link (L), the program code comprises sets of instructions for:
exchanging the messages (D) with the at least one other station (200, 300) in the group, the messages (D) sent from a particular station (100) comprising data pertaining to an availability status ($D_{res\text{-}status}$) for each resource in the station's (100) local set (140) and a threat status ($D_{thr\text{-}status}$) registered by the station (100); and
checking whether the station (100) shall assume a central planning function in respect of a complete set of electronic warfare resources (140+240+340) including all electronic warfare resources ($R_{11}, \ldots, R_{1i}; R_{21}, \ldots, R_{1j}; R_{n1}, \ldots, R_{nk}$) of the at lease two stations (100, 200, 300) in the group; and given that the station (100) is to assume the central planning function, the method comprising coordinating any emission of jamming signals ($J_A; J_B$) from the resources in the complete set based on:
estimated geometric interrelationships between the at least two stations (100, 200, 300) in the group,
estimated geometric relationships between the at least two stations (100, 200, 300) in the group and at least one threat (X1, X2) registered by at least one station in the group, and
the respective local set (140, 240, 340) of each station (100, 200, 300) in the group.

12. A computer program product in a computer readable medium having computer program code recorded thereon, wherein the program code includes sets of instructions comprising:
first computer instructions for exchanging the messages (D) with the at least one other station (200, 300) in the group, the messages (D) sent from a particular station (100) comprising data pertaining to an availability status ($D_{res\text{-}status}$) for each resource in the station's (100) local set (140) and a threat status ($D_{thr\text{-}status}$) registered by the station (100); and
second computer instructions for checking whether the station (100) shall assume a central planning function in respect of a complete set of electronic warfare resources (140+240+340) including all electronic warfare resources ($R_{11}, \ldots, R_{1i}; R_{21}, \ldots, R_{1j}; Rn_{n1}, \ldots, R_{nk}$) of the at lease two stations (100, 200, 300) in the group; and given that the station (100) is to assume the central planning function, the method comprising coordinating any emission of jamming signals ($J_A; J_B$) from the resources in the complete set based on:
third computer instructions for estimated geometric interrelationships between the at least two stations (100, 200, 300) in the group,
fourth computer instructions for estimated geometric relationships between the at least two stations (100, 200, 300) in the group and at least one threat (X1, X2) registered by at least one station in the group, and
fifth computer instructions for the respective local set (140, 240, 340) of each station (100, 200, 300) in the group.

13. An electronic counter measures station (100) to be included as one of at least two stations (100, 200, 300) in a distributed counter measures system for radiating jamming signals, where the at least two stations (100, 200, 300) are physically separated from one another and associated with one another in a group of stations, the station (100) comprising:
a communication unit (160) adapted to exchange messages (D) over a wireless data link (L); and
a local set (140) of electronic warfare resources ($R_{11}, \ldots, R_{1i}$) including at least one resource adapted to generate and emit at least one type of jamming signal ($J_A$), wherein the station (100) is associated with at least one threat warning system (105) adapted to register threats (X1, X2) and in response thereto produce a threat status ($D_{thr\text{-}status}$);
the communication unit (160) is adapted to exchange the messages (D) with the at least one other station (200, 300) in the group, the messages (D) sent from a particular station (100) comprise data pertaining to an availability status ($D_{res\text{-}status}$) for each resource in the station's (100) local set (140) and the threat status ($D_{thr\text{-}status}$) registered by the station (100); and
the station (100) comprises a resource handling unit (150) adapted to assume a central planning function in respect of a complete set of electronic warfare resources (140+240+340) including all electronic warfare resources ($R_{11}, \ldots, R_{1i}; R_{21}, \ldots, R_{1j}; R_{n1}, \ldots, R_{nk}$) of the at least two stations (100, 200, 300) in the group, and when having the central planning function the resource handling unit (150) is adapted to coordinate any jamming signals ($J_A; J_B$) emitted from the resources in the complete set (140+240+340) based on:
estimated geometric interrelationships between the at least two stations (100, 200, 300) in the group,
estimated geometric relationships between the at least two stations (100, 200, 300) in the group and at least one registered threat (X1, X2), and
the respective local set (140, 240, 340) of each station (100, 200, 300) in the group.

14. The station (100) according to claim 13, wherein it comprises a database (110) including:
a threat library (411) specifying signal parameter information pertaining to a number of known threats;

a counter measure library (412) specifying the electronic warfare resources of the complete set (140+240+340); and a table (413) which for each of said threats identifies at least one of the resources in the complete set (140+240+340) that is estimated to constitute an appropriate counter measure to combat the threat.

15. The station (100) according to claim 14, wherein the table (413) for each combination of threat and appropriate counter measure specifies whether the threat is preferably combated by means of distributed counter measures involving emission of jamming signals from two or more stations, or by means of jamming signals emitted from a singular station.

16. The station (100) according to claim 13, wherein when having the central planning function, the resource handling unit (150) is adapted to coordinate the emission of jamming signals ($J_A$; $J_B$) from the stations (100, 200, 300) in the group such that an overall use of the resources in the complete set (140+240+340) is estimated to be optimized with respect to all of the at least one registered threat (X1, X2).

17. The station (100) according to claim 13, wherein the resource handling unit (150) is associated with:

a local resource listing (551) which for each electronic warfare resource ($R_{11}, \ldots, R_{1i}$) in the local set (140) specifies whether the resource is currently available for emitting jamming signals; and a group resource listing (552) which specifies an activation status for each electronic warfare resource ($R_{21}, \ldots, R_{2j}; R_{n1}, \ldots, R_{nk}$) included in the at least one other station (200, 300) of the group; and the resource handling unit (150) is adapted to update the group resource listing (552) with a current resource activation status for each resource of the electronic warfare resource ($R_{21}, \ldots, R_{2j}; R_{n1}, \ldots, R_{nk}$) included in the other stations (200, 300) in the group based on any received messages (D) from the other stations (200; 300) in the group.

18. The station (100) according to claim 17, wherein the resource handling unit (150) when not having the central planning function, is adapted to:

receive request messages ($D_{req}$) and deactivation orders ($D_{cut}$) via the communication unit (160) and wireless data link (L); and activate respective deactivate specified electronic warfare resources in response to any received request messages ($D_{req}$) and/or deactivation orders ($D_{cut}$).

19. The station (100) according to claim 18, wherein the resource handling unit (150) when not having the central planning function is adapted to, in case of at least one received request message ($D_{req}$) compare a first set of threat parameters of each of the at least one received request messages ($D_{req}$) with any second set of threat parameters associated with threat statuses ($D_{thr\text{-}status}$) registered by the station (100) to obtain a correlated threat parameter set for each threat in respect of which request messages ($D_{req}$) has been received; and activate the electronic warfare resources specified in the at least one received request message ($D_{req}$) based on each correlated threat parameter set.

20. The station (100) according to claim 18, wherein, the resource handling unit (150) when not having the central planning function is adapted to control the communication unit (160) to send a reject message in response to a received request message ($D_{req}$) if an electronic warfare resource specified in the request message ($D_{req}$) cannot be activated by the station (100).

21. The station (100) according to claim 17, wherein the resource handling unit (150) when having the central planning function, is adapted to:

compile, based on the threat statuses ($D_{thr\text{-}status}$) produced by the at least one threat warning system (105) and any received messages (D) from the other stations (200; 300) in the group, a threat listing (555) comprising all threats (X1, . . . , Xm) registered by at least one station (100, 200, 300) in the group;

determine, based on the group resource listing (552), for each threat (X1, . . . , Xm) in the threat listing (555) whether the threat appears to be combated by an appropriate resource in the complete set (140+240+340); and if an alternative distribution of electronic warfare resources different from a current distribution given by the group resource listing (552) is estimated to be superior to the current distribution in respect of jamming efficiency control the communication unit (150) to send out request messages ($D_{req}$) and/or deactivation orders ($D_{cut}$) with such addressees and specifications that the electronic warfare resources ($R_{11}, \ldots, R_{1i}; R_{21}, \ldots, R_{1j}; R_{n1}, \ldots, R_{nk}$) of the at least two stations (100, 200, 300) in the group emit jamming signals according to the alternative distribution.

22. The station (100) according to claim 18, wherein the resource handling unit (150) is adapted to:

when having the central planning function, maintain emission of a particular jamming signal ($J_A$) until:

all threats combated by the particular jamming signal ($J_A$) have ceased to constitute threats, or given the threat listing (555) and the group resource listing (552), another electronic warfare resource ($R_{11}, \ldots, R_{1i}; R_{21}, \ldots R_{1j}; R_{n1}, \ldots R_{nk}$) appears to be more appropriate to instead emit the particular jamming signal ($J_A$); and otherwise, maintain emission of a particular jamming signal ($J_B$) until the communication unit (160) receives a deactivation order ($D_{cut}$) in respect of that jamming signal ($J_B$) over the wireless data link (L).

* * * * *